United States Patent
Pillai

(10) Patent No.: US 10,796,399 B2
(45) Date of Patent: Oct. 6, 2020

(54) PIXEL WAIT SYNCHRONIZATION

(71) Applicant: Advanced Micro Devices, Inc., Santa Clara, CA (US)

(72) Inventor: Pazhani Pillai, Tewksbury, MA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/208,073

(22) Filed: Dec. 3, 2018

(65) Prior Publication Data

US 2020/0175642 A1    Jun. 4, 2020

(51) Int. Cl.
G06T 1/20      (2006.01)
G06T 1/60      (2006.01)
G06T 7/507    (2017.01)
G06T 15/80    (2011.01)

(52) U.S. Cl.
CPC .............. G06T 1/20 (2013.01); G06T 1/60 (2013.01); G06T 7/507 (2017.01); G06T 15/80 (2013.01)

(58) Field of Classification Search
CPC .. G06T 1/20; G06T 1/60; G06T 7/507; G06T 15/80
USPC .................................................. 345/501, 506
See application file for complete search history.

(56) References Cited

U.S. PATENT DOCUMENTS

| | | | |
|---|---|---|---|
| 6,202,164 B1 | 3/2001 | Gulick | |
| 7,636,819 B2 | 12/2009 | Alsup | |
| 7,737,983 B2* | 6/2010 | Brothers | G06F 9/3879 345/506 |
| 7,755,632 B2* | 7/2010 | Brothers | G06F 9/3879 345/502 |
| 7,788,468 B1* | 8/2010 | Nickolls | G06F 9/30087 712/22 |
| 10,402,935 B2* | 9/2019 | Foo | |
| 2007/0050563 A1 | 3/2007 | Alsup | |
| 2010/0110089 A1* | 5/2010 | Paltashev | G06T 1/20 345/522 |
| 2018/0314520 A1* | 11/2018 | Tirumala | G06F 9/3009 |

* cited by examiner

*Primary Examiner* — Jacinta M Crawford
(74) *Attorney, Agent, or Firm* — Kowert Hood Munyon Rankin and Goetzel PC; Rory D. Rankin

(57) ABSTRACT

Systems, apparatuses, and methods for implementing pixel wait synchronization techniques are disclosed. A system includes a host processor and a graphics processor which includes at least one graphics pipeline. During execution of a graphics application, the host processor determines that a second draw call is dependent on a first draw call. The host processor issues a wait sync event prior to issuing the second draw call to the graphics pipeline responsive to determining that the first draw call is still in-flight in the graphics pipeline. After the second draw call is issued to the graphics pipeline, the second draw call is processed by one or more stages of the graphics pipeline while the first draw call is still in-flight. The graphics pipeline stalls the second draw call at a given intermediate stage until a corresponding event counter equals a value specified by the wait sync event.

20 Claims, 10 Drawing Sheets

PIXEL WAIT SYNCHRONIZATION

BACKGROUND

Description of the Related Art

Graphics processors are often used as part of computer graphics processing systems to create computer-generated imagery from a geometric model. A geometric model defines various objects, details, lighting sources, and other elements of a virtual scene. The computing system determines how to render a given scene based on the geometric model and other inputs from a software application. A graphics processor (e.g., graphics processing unit (GPU)) typically includes one or more multi-stage graphics processing pipelines that process the inputs and the geometric model to generate a two or three dimensional array of pixel color values that represent the desired image or video frame. A graphics application typically issues multiple draw calls for simultaneous execution by a graphics processor. As used herein, the term "draw call" is defined as a call by a general processor (e.g., central processing unit (CPU)) to a graphics processor to perform a variety of actions to generate pixels to represent one or more objects. Often, a draw call reads from a surface which first needs to being written to by a previous draw call.

When transitioning a writeable surface from a first cache to a second cache, a graphics pipeline typically flushes and invalidates the first cache after completing a draw to the writeable surface. Then, the graphics pipeline waits for the flush to commit to the second cache or to memory. After the flush of the surface, the graphics pipeline attaches the surface to the second cache and renders the dependent draw call. For back-to-back dependent draw calls, this results in a full graphics pipeline drain prior to issuing the dependent draw call.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
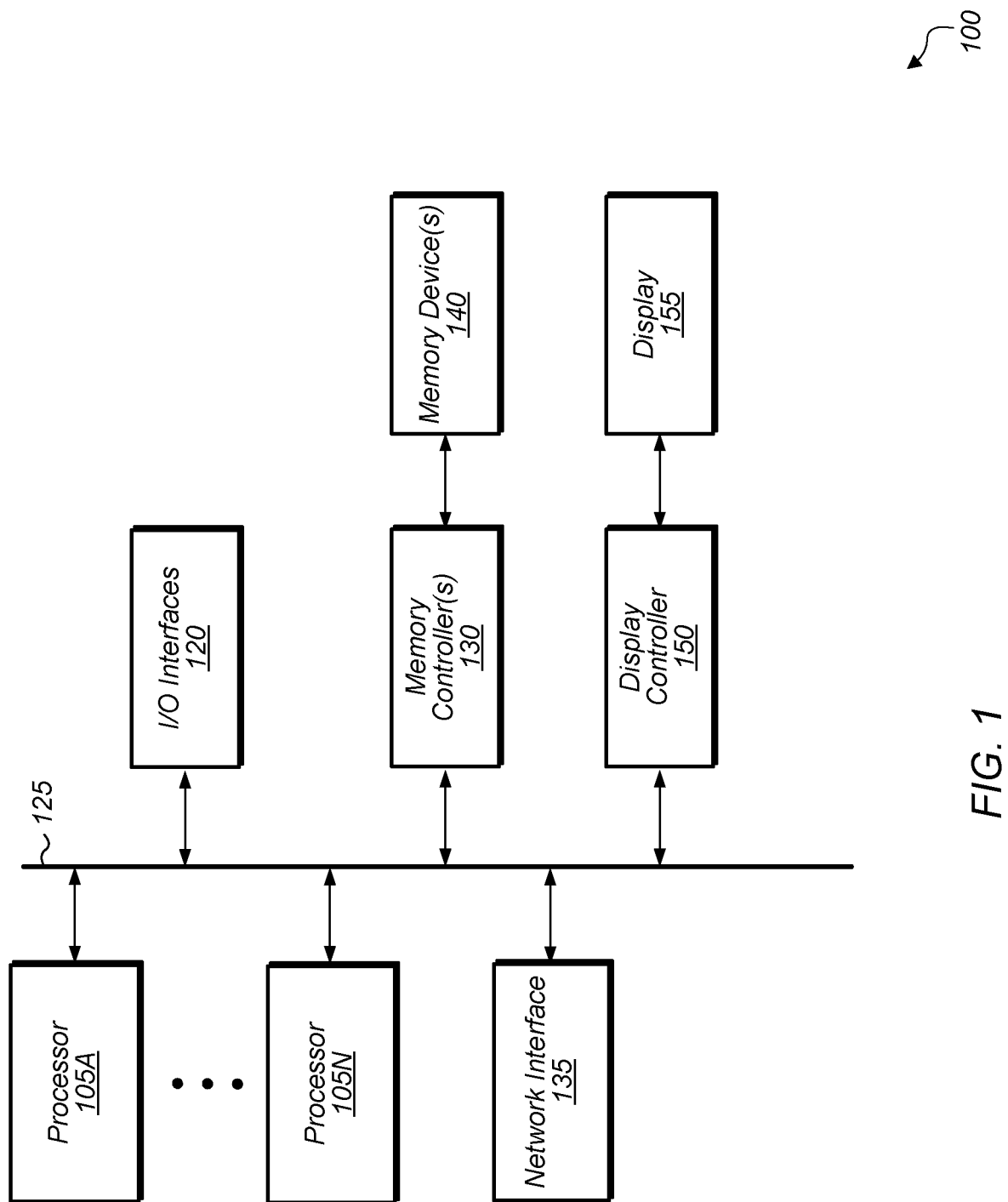
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing pixel wait synchronization techniques are disclosed herein. A computing system includes a host processor and a graphics processor which includes at least a command processor and a graphics pipeline. In one implementation, the host processor executes a software driver and launches kernels to execute on the graphics processor. During execution of a graphics application, draw calls are issued by the command processor to the graphics pipeline. Many of these draw calls are dependent on previously issued draw calls. When the driver determines that a yet to be issued second draw call is dependent on a previously issued first draw call that is still in-flight, the driver issues a wait sync event to the graphics pipeline. The wait sync event is issued to the graphics pipeline prior to the second draw call being issued to the graphics pipeline. After the command processor issues the second draw call to the graphics pipeline, the second draw call is processed by one or more stages of the graphics pipeline while the first draw call is still in-flight. In one implementation, the one or more stages of the graphics pipeline are a vertex shader stage, a geometry shader stage, a rasterization stage, and a depth processing stage.

When the second draw call reaches a given intermediate stage of the graphics pipeline, the second draw call is stalled until a corresponding event counter equals a value specified by the wait sync event. In one implementation, the given intermediate stage of the graphics pipeline is a pixel shader stage. If the corresponding event counter equals the value specified by the wait sync event, then the given intermediate stage processes the second draw call. In one implementation, processing the second draw call involves reading from a surface that was written to by the first draw call. After the given intermediate stage, the graphics pipeline completes processing of the second draw call so as to generate pixels for display.

Prior to issuing the wait sync event associated with the second draw call, the command processor determines how many draw calls were issued to the graphics pipeline in between the first draw call and the second draw call. Then, the command processor sets a counter value in the wait sync event equal to this number of draw calls that were issued to the graphics pipeline in between the first draw call and the second draw call. In one implementation, the command processor issues a time stamp event into the graphics pipeline along with each issued draw call. The graphics pipeline increments an event counter for the given intermediate stage in response to a time stamp event reaching the given intermediate stage. The graphics pipeline decrements the event counter when a given draw call passes through all stages of the graphics pipeline. In this way, the event counter tracks how many in-flight draw calls have already passed the given intermediate stage.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
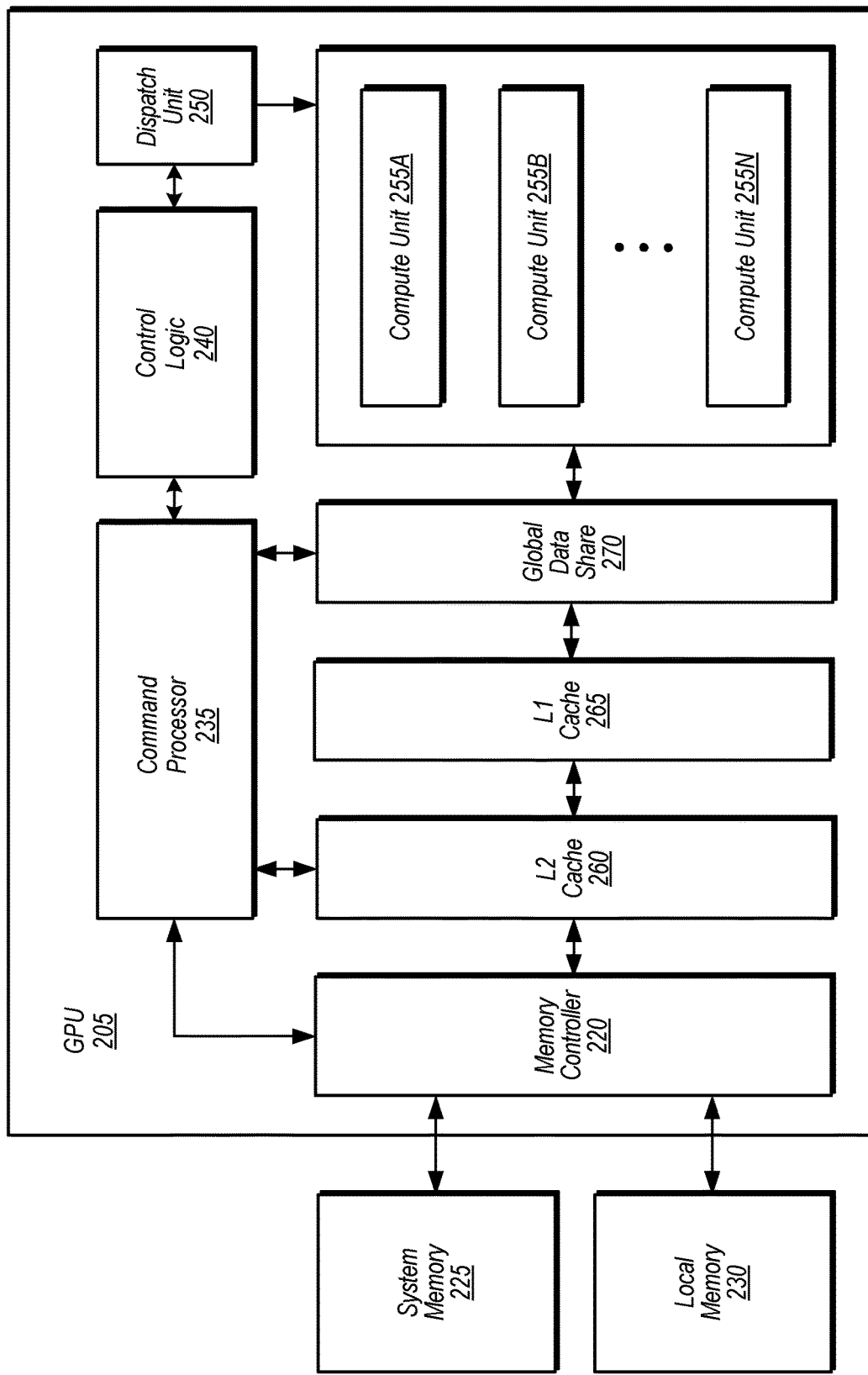
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches kernels to be performed on GPU 205. Command processor 235 receives kernels from the host CPU and uses dispatch unit 250 to issue corresponding draw calls to compute units 255A-N. It is noted that dispatch unit 250 can also be referred to herein as a scheduler. In one implementation, a driver executing on the host CPU monitors dependencies between draw calls and provides indications to dispatch unit 250 for when to issue wait sync events to compute units 255A-N. In another implementation, control logic 240 and/or command processor 235 monitor dependencies between draw calls and cause wait sync events to be issued to compute units 255A-N. In one implementation, a wait sync event is issued prior to a given draw call that is dependent on a previously issued draw call that is still in-flight. The given draw call is issued after the wait sync event, and the given draw call is able to go through at least a portion of the graphics pipeline while the previously issued draw call is still in-flight. The wait sync event will cause the given draw call to wait at an intermediate pipeline stage if the previously issued draw call has not completed. The intermediate pipeline stage is the stage where the given draw call will be reading a surface being written by the previously issued draw call. Draw calls executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

Figure 3:
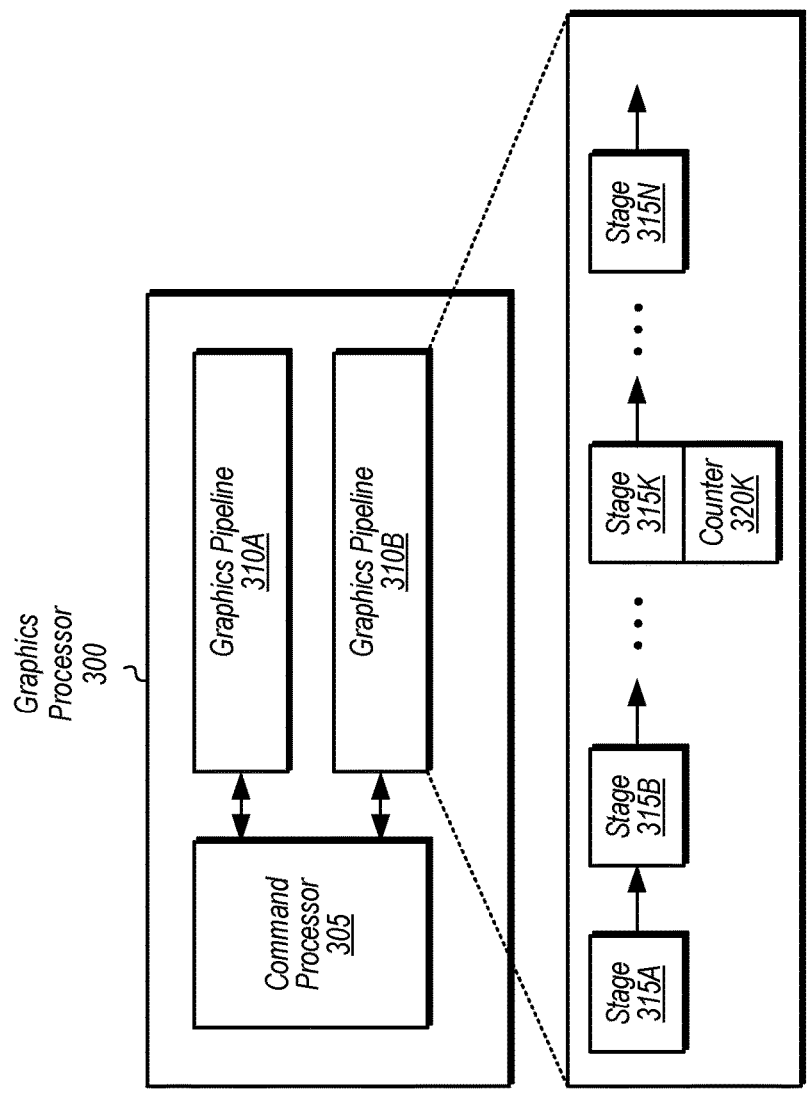
FIG. 3 is a block diagram of one implementation of a graphics processor.

Referring now to FIG. 3, a block diagram of one implementation of a graphics processor 300 is shown. In one implementation, graphics processor 300 includes at least command processor 305 and graphics pipelines 310A-B. It is noted that graphics processor 300 includes any number of other components which are not shown to avoid obscuring the figure. While graphics processor 300 includes two graphics pipeline 310A-B as shown in FIG. 3, it should be understood that in other implementations, a graphics pipeline can include other numbers of graphics pipelines.

In one implementation, in response to detecting a draw call that is dependent on a previously issued draw call that is still in-flight, a wait sync event is issued into the corresponding graphics pipeline 310A-B prior to the dependent draw call. When the dependent draw call is issued, the dependent draw call is allowed to proceed through stages 315A-B and other stages up to stage 315K while the earlier draw call upon which it depends is still in-flight.

A count value is also embedded in the wait sync event. The count value refers to the value that the wait sync event will wait for counter 320K to reach before the dependent draw call is allowed to be processed by stage 315K. In one implementation, an identifier (ID) of the pipe stage at which the dependent draw call should wait is also embedded in the wait sync event. In one implementation, any image reads that follow the wait sync event are not allowed to be performed until the event (i.e., counter 320K reaching the specified value) to wait on has occurred.

Figure 4:
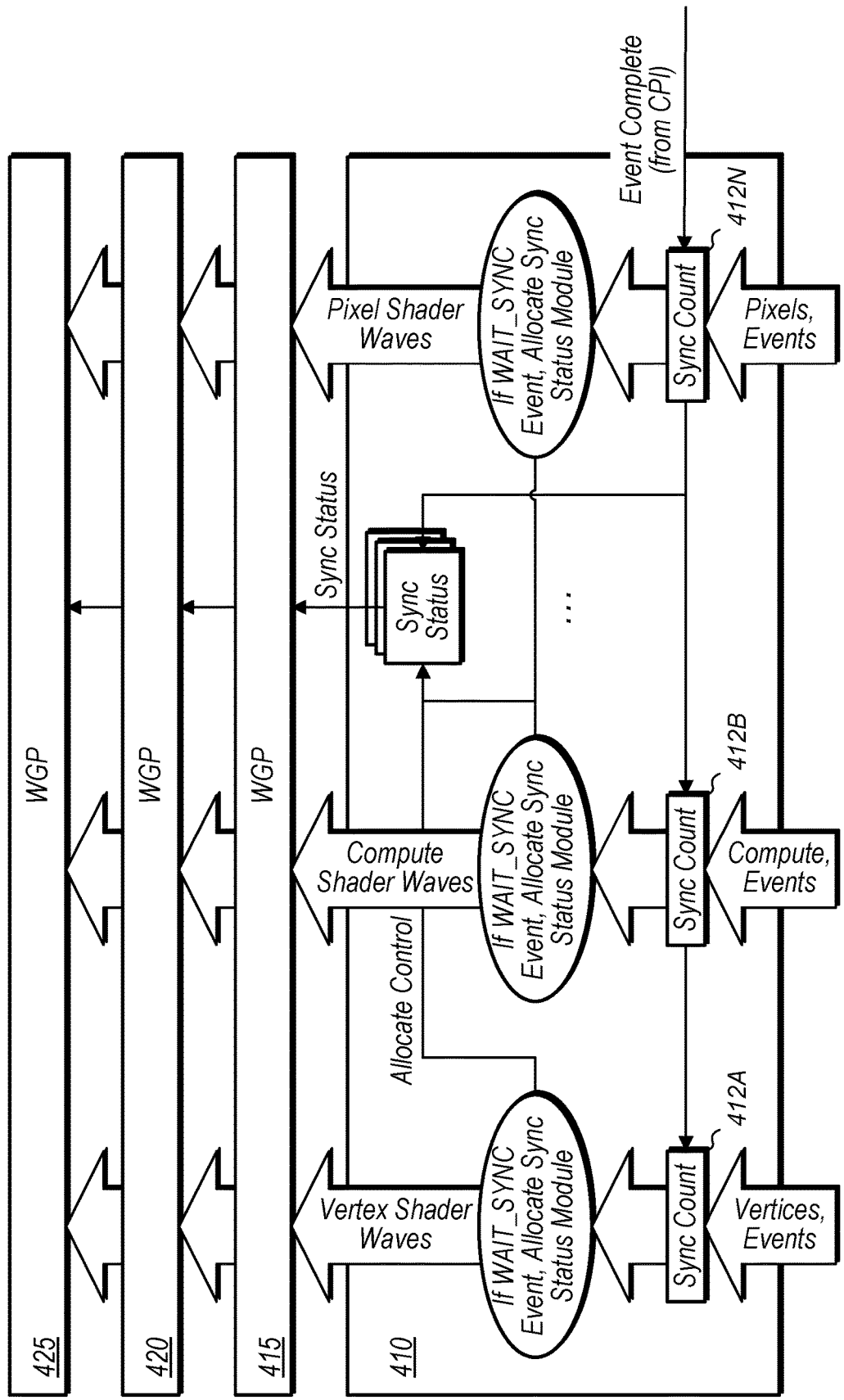
FIG. 4 is a block diagram of one implementation of a wait sync event generator.

Turning now to FIG. 4, a block diagram of one implementation of a wait sync event generator 410 is shown. In one implementation, wait sync event generator 410 is implemented for each graphics pipeline in a graphics processor. For example, in one implementation, a graphics processor (e.g., graphics processor 300 of FIG. 3) includes two graphics pipeline (e.g., graphics pipelines 310A-B), with a separate wait sync event generator 410 for each graphics pipeline. In another implementation, a graphics processor includes other numbers of graphics pipelines.

In one implementation, timestamp events that are received at the vertex shader stage are used to increment sync counter 412A. If a wait sync event precedes a given draw call, then when the given draw call reaches the vertex shader stage, the draw call waits until the sync counter 412A is equal to a value specified within the wait sync event. Similarly, timestamp events that are received at the compute shader stage increment sync counter 412B and timestamps events that are received at the pixel shader stage increment sync counter 412N. When a draw call completely traverses the graphics pipeline, then a completion signal is generated and conveyed to sync counters 412A-N, causing each of sync counters 412A-N to be decremented.

In one implementation, waves that are dependent on previously issued waves are launched into the graphics pipeline even if the corresponding sync counter 412A-N does not equal the value specified in the wait sync event. Shader instructions are allowed to execute until the shader program reaches an instruction that could potentially read from a dependent surface. Examples of an instruction that could potentially read from a dependent surface include a texture fetch instruction, an image load instruction, etc. When one of these instructions is reached, the corresponding workgroup pipeline 415, 420, or 425 reads the corresponding sync counter 412A-N and only executes the instruction if the status of the counter indicates that the previous draw has already completed. In one implementation, the sync status information is daisy-chained through the workgroup pipelines 415, 420, and 425 to provide this information when a potential read from a dependent surface is encountered. In one implementation, if the corresponding sync counter 412A-N is equal to 0, this indicates that the previous draw upon which the current instruction depends has already completed.

Figure 5:
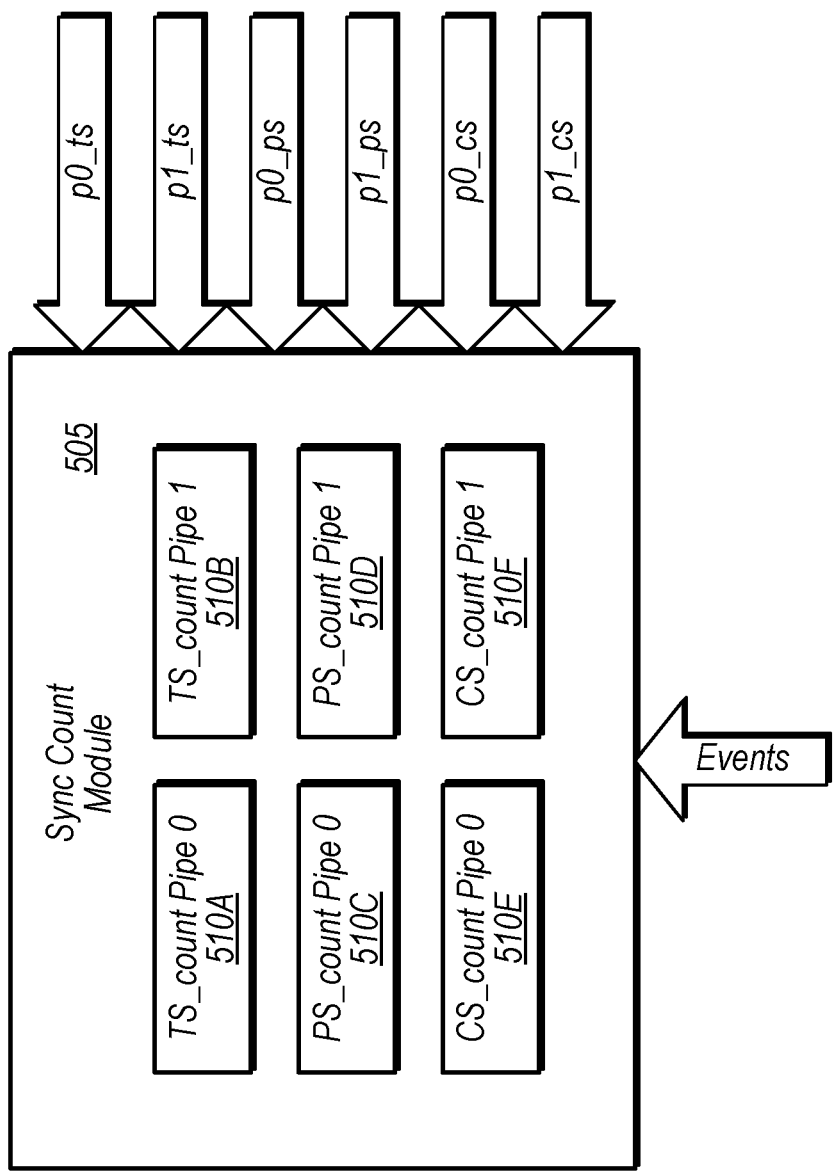
FIG. 5 is a block diagram of one implementation of a sync count module.

Referring now to FIG. 5, a block diagram of one implementation of a sync count module 505 is shown. In one implementation, a graphics processor includes two graphics pipelines which are referred to as pipe 0 and pipe 1. In other implementations, the graphics processor includes other numbers of graphics pipelines. While sync count module 505 is illustrated for the case when the graphics processor includes two graphics pipelines, it should be understood that other sync count modules can be implemented in a similar fashion to work with other numbers of graphics pipelines.

In one implementation, sync count module 505 includes counters 510A-F for counting the time stamp events of different stages of the two graphics pipelines. For example, TS_count Pipe 0 counter 510A counts the timestamp events that traverse the vertex shader of pipeline 0, TS_count Pipe 1 counter 510B counts the timestamp events that traverse the vertex shader of pipeline 1, PS_count Pipe 0 counter 510C counts the timestamp events that traverse the pixel shader of pipeline 0, PS_count Pipe 1 counter 510D counts the timestamp events that traverse the pixel shader of pipeline 1, CS_count Pipe 0 counter 510E counts the timestamp events that traverse the compute shader of pipeline 0, and CS_count Pipe 1 counter 510F counts the timestamp events that traverse the compute shader of pipeline 1. It is noted that other stages of the graphics pipeline(s) can also have counters for counting the numbers of timestamp events that have traversed these stages.

In one implementation, each timestamp counter increments when a timestamp event passes through a corresponding stage of the pipeline. Each timestamp counter decrements when a draw call exits the pipeline after all processing has been completed for the draw call. When a wait sync event reaches a given stage of a pipeline, the subsequent draw call waits until the counter for the given stage is equal to the value specified in the wait sync event. This ensures that any dependencies between draw calls are resolved prior to the given stage processing a draw call which is preceded by a corresponding wait sync event.

Figure 6:
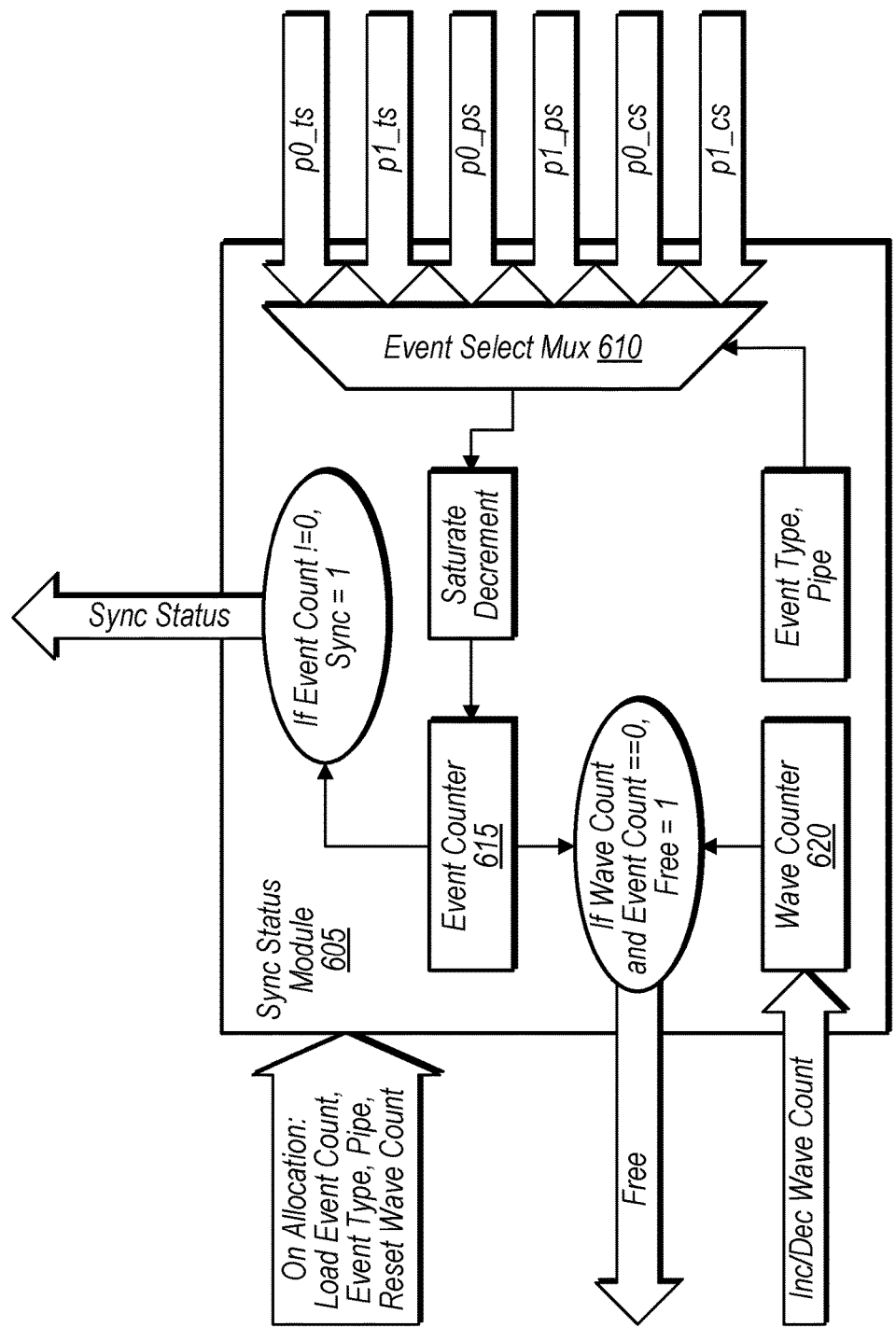
FIG. 6 is a block diagram of one implementation of a sync status module.

Turning now to FIG. 6, a block diagram of one implementation of a sync status module 605 is shown. In one implementation, sync status module 605 tracks the status of wait sync events and corresponding draw calls traversing the different stages of one or more graphics pipelines. In various implementations, a draw call that is dependent on a previous draw call is issued with a wait sync event. In one implementation, the wait sync event is issued before the draw call. In another implementation, the wait sync event is attached to or embedded with the draw call.

In one implementation, if a graphics pipeline receives a wait sync event for which it is the target, the graphics pipeline will allocate a sync status module 605. Upon allocation, the sync status module 605 will be loaded with the event type to wait for, and the sync status module 605 is loaded with the number of event complete strobes to wait for until the sync has completed. In one implementation, the sync status module 605 outputs a single bit indicating whether the sync has completed or not, and this single bit gets sent through all of the workgroup pipelines.

In one implementation, when a graphics pipeline receives a wait sync event, if all of the sync status modules are already allocated, then the graphics pipeline will stall until a sync status module becomes available. Waves after the wait sync event will be launched to a workgroup pipeline and with an indication of which sync status module to wait for. When a wave executes an image load operation, if the sync status bit indicates that the sync has not completed, then the wave will be put to sleep until the sync is complete, at which point the image load operation will be retried.

In one implementation, different timestamp and sync events are received by sync status module 605 via event select multiplexer 610. The select signal for event select multiplexer 610 is generated based on the event type and the specific pipeline of the graphics processor. The event counter 615 of a given stage is decremented for draw calls that are completed by the corresponding pipeline. The wave counter 620 is incremented or decremented based on waves traversing a given stage of the corresponding pipeline. In one implementation, if the wave count and event count both equal 0, then the sync status module 605 is freed. Also, in one implementation, if the event count does not equal 0 then the sync status is set, then the set sync status is output from sync status module 605 to allow a draw call to begin processing. In one implementation, the draw call is allowed to read a surface in response to the sync status being set. Otherwise, if the sync status is not set, then the draw call is not allowed to read the surface. If the sync status is not set, this indicates that a previously issued draw call could still be writing to the surface.

Figure 7:
FIG. 7 is a diagram of one implementation of issuing a timestamp event at a midpoint of a screen.

Referring now to FIG. 7, a diagram of one implementation of issuing a timestamp event at a midpoint of a screen is shown. In one implementation, a graphics driver detects draw calls that could be a full screen pass. In one implementation, for graphics tasks, draw calls with one or two primitives are tagged as full screen passes. In one implementation, for compute tasks that touch an entire surface, all threads of each wave that only write to pixels within the wave dimension are tagged as a full screen pass.

In one implementation, full screen draw calls can be split into two draws 705 and 710 as shown in FIG. 7. In one implementation, the first draw 705 will scissor the upper half of the surface while the second draw 710 will scissor the lower half of the surface. In one implementation, first draw 705 and second draw 710 will each be followed by a flush and invalidate timestamp event. In one implementation, for full screen draws, the graphics pipeline inserts the flush and invalidate time stamp event halfway through rendering the surface. The driver then sends an additionally time stamp done event after the first draw 705.

In one implementation, if the last draw call to a surface was a full screen pass and the surface will be processed by a subsequent draw call, then the driver issues a specially tagged wait sync event. When the graphics pipeline receives a full screen tagged wait sync event, the graphics pipeline allocates two sync status modules. A first sync status module is allocated for the upper half of the surface and the second sync status module is allocated for the lower half of the surface. The draw call 705 for the upper half of the surface waits for one sync event earlier than the draw call 710 for the lower half of the surface.

In one implementation, waves are launched with the IDs of both sync status modules. When an image operation is issued, the graphics pipeline receives the two sync status bits along with the Y-value marking the midway point of the surface. The graphics pipeline multiplexes the two sync status bits based on whether the Y-coordinate of the image operation is above or below the midway point of the surface. If the multiplexed sync status bit indicates that the sync is not complete, the graphics pipeline notifies the scheduler to put the wave to sleep. The image operation gets reissued when the wave wakes up after the sync is complete.

Figure 8:
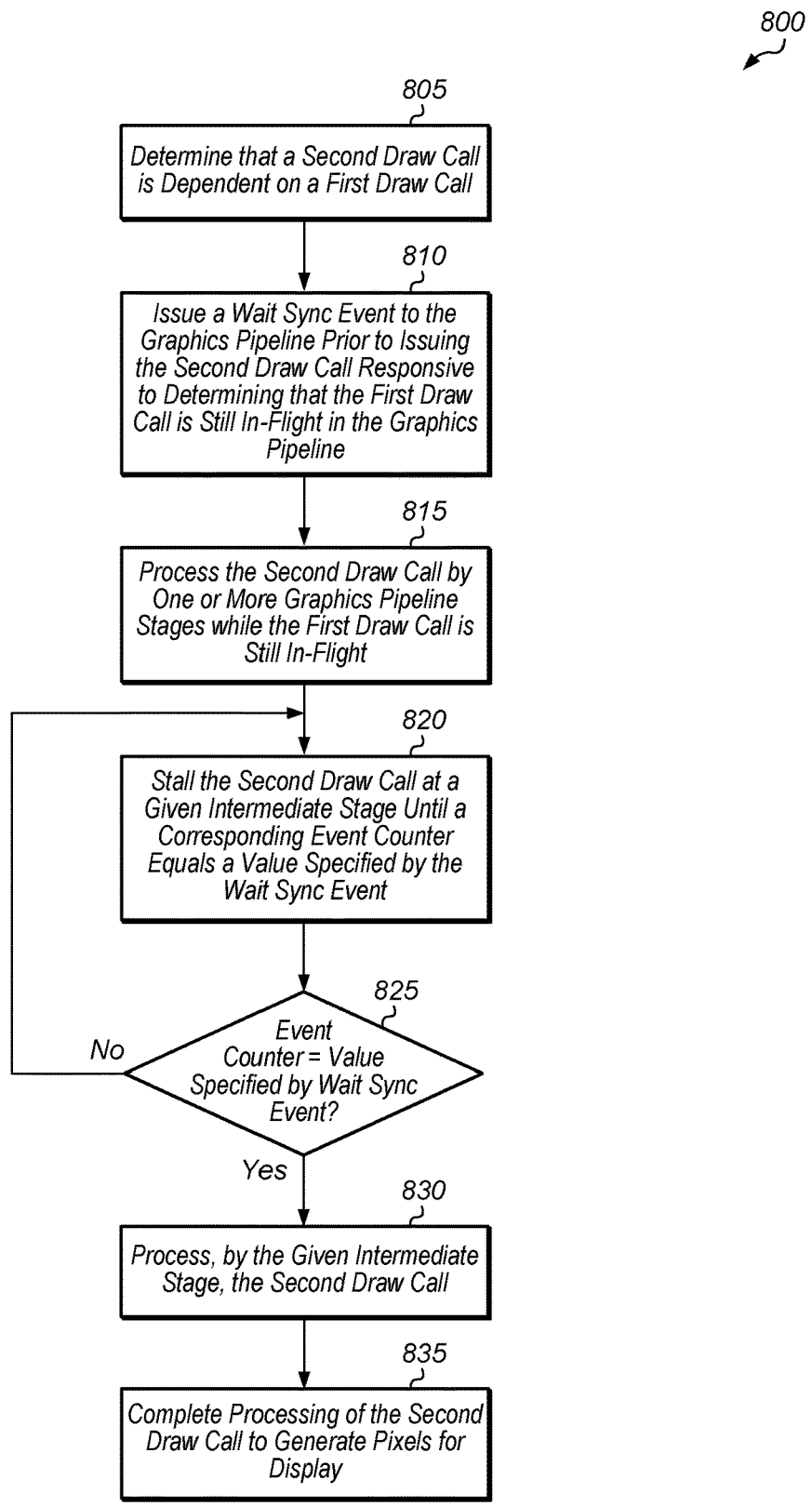
FIG. 8 is a generalized flow diagram illustrating one implementation of a method for implementing a pixel wait synchronization mechanism.
Figure 9:
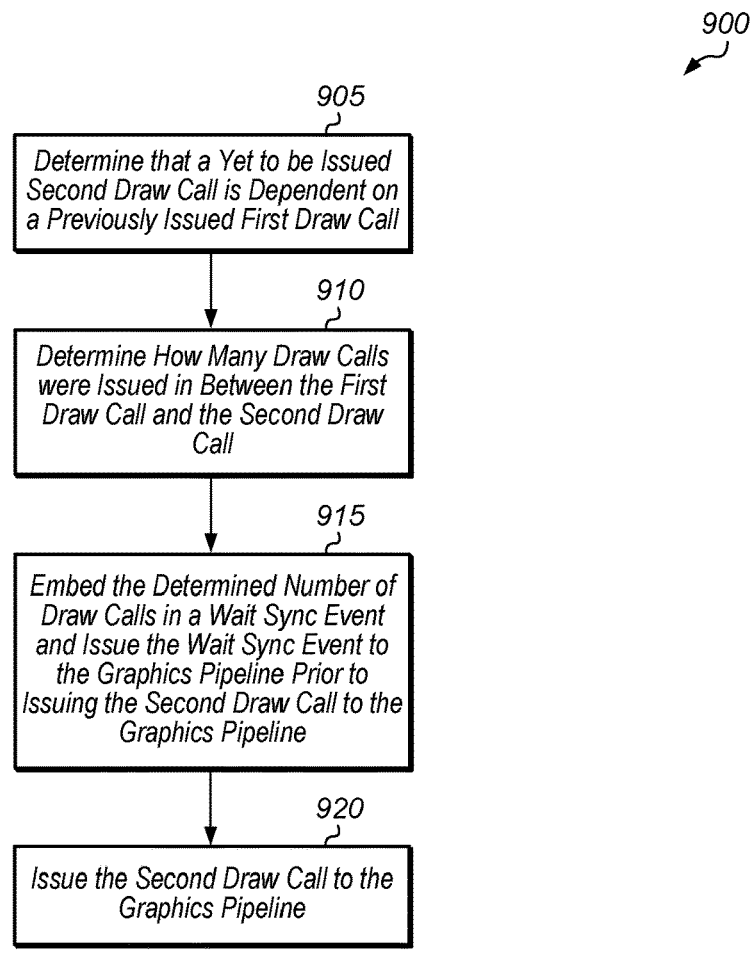
FIG. 9 is a generalized flow diagram illustrating one implementation of a method for issuing a wait sync event with an embedded counter value.
Figure 10:
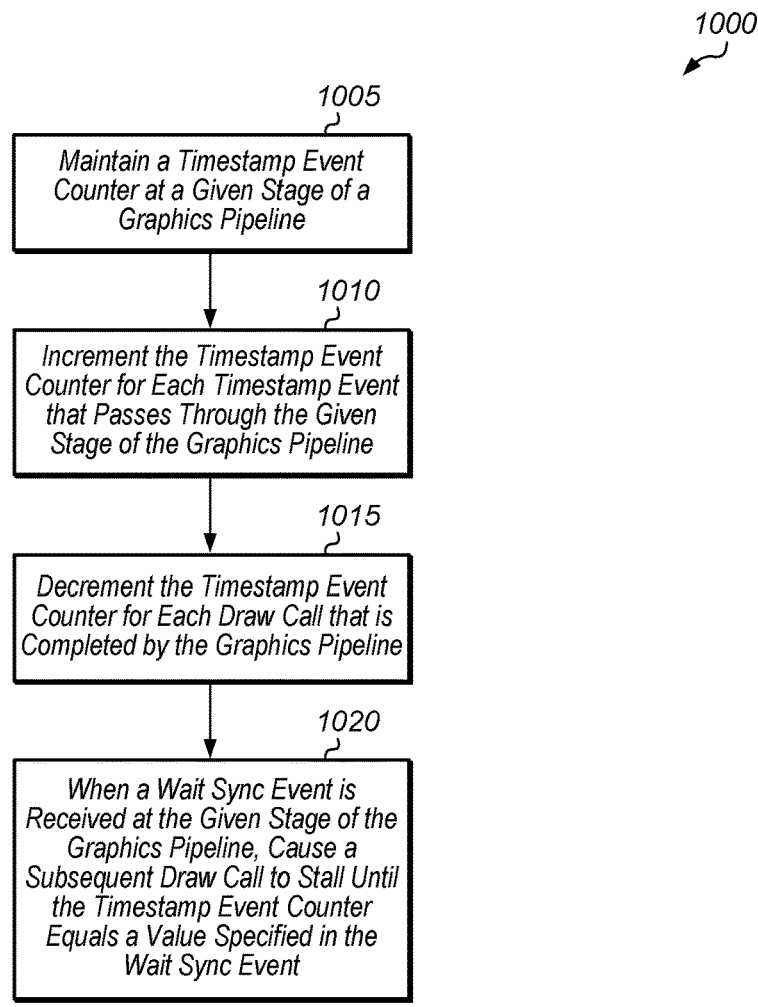
FIG. 10 is a generalized flow diagram illustrating one implementation of a method for implementing a timestamp event counter.

Turning now to FIG. 8, one implementation of a method 800 for implementing a pixel wait synchronization mechanism is shown. For purposes of discussion, the steps in this implementation and those of FIG. 9-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 800.

A software driver determines that a second draw call is dependent on a first draw call (block 805). It should be understood that there may be one or more draw calls that were issued in between the first and second draw calls. Next, the software driver issues a wait sync event to the graphics pipeline prior to the second draw call being issued to the graphics pipeline responsive to determining that the first draw call is still in-flight in the graphics pipeline (block 810). In other implementations, a command processor, control logic, and/or another hardware or software component detects the dependency and issues the wait sync event. After the command processor issues the second draw call to the graphics pipeline, the second draw call is processed by one or more stages of the graphics pipeline while the first draw call is still in-flight (block 815). In one implementation, the one or more stages of the graphics pipeline are a vertex shader stage, a geometry shader stage, a rasterization stage, and a depth processing stage.

Next, the graphics pipeline stalls the second draw call at a given intermediate stage until a corresponding event counter equals a value specified by the wait sync event (block 820). In one implementation, the given intermediate stage of the graphics pipeline is a pixel shader stage. If the corresponding event counter equals the value specified by the wait sync event (conditional block 825, "yes" leg), then the given intermediate stage processes the second draw call (block 830). In one implementation, processing the second draw call involves reading from a surface written to by the first draw call. Then, the graphics pipeline completes processing of the second draw call so as to generate pixels for display (block 835). After block 835, method 800 ends. If the corresponding event counter does not equal the value specified by the wait sync event (conditional block 825, "no" leg), then method 800 returns to block 820.

Referring now to FIG. 9, one implementation of a method 900 for issuing a wait sync event with an embedded counter value is shown. A software driver determines that a yet to be issued second draw call is dependent on a previously issued first draw call (block 905). The software driver determines how many draw calls were issued in between the first draw call and the second draw call (block 910). Next, the software driver embeds the determined number of draw calls in a wait sync event and issues the wait sync event to the graphics pipeline prior to issuing the second draw call to the graphics pipeline (block 915). Then, a command processor issues the second draw call to the graphics pipeline (block 920). After block 920, method 900 ends.

Referring now to FIG. 10, one implementation of a method 1000 for implementing a timestamp event counter is shown. A timestamp event counter is maintained at a given stage of the graphics pipeline (block 1005). It is noted that in some implementations, the graphics pipeline maintains multiple timestamp event counters at multiple different stages within the graphics pipeline. Next, the timestamp event counter is incremented for each timestamp event that passes through the given stage of the graphics pipeline (block 1010). Also, the timestamp event counter is decremented for each draw call that is completed by the graphics pipeline (block 1015). As used herein, the term "completed" when used with respect to a draw call is defined as the draw call passing through all stages of the graphics pipeline. When a wait sync event is received at the given stage of the graphics pipeline, the given stage causes a subsequent draw call to stall until the timestamp event counter equals a value specified in the wait sync event (block 1020). After block 1020, method 1000 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a processor configured to:
determine that a second draw call is dependent on a first draw call;
issue a wait sync event to a graphics pipeline prior to issuing the second draw call responsive to determining that the first draw call is still in-flight; and
the graphics pipeline comprising a plurality of stages, wherein the graphics pipeline is configured to:
process the second draw call in one or more stages while the first draw call is still in-flight;
stall the second draw call at a given intermediate stage until an event counter equals a value specified by the wait sync event;
allow the second draw call to be processed by the given intermediate stage responsive to determining that the event counter equals the value specified by the wait sync event; and
complete processing of the second draw call to generate pixels for display.

2. The system as recited in claim 1, wherein the given intermediate stage of the graphics pipeline is a pixel shader stage.

3. The system as recited in claim 2, wherein the one or more stages of the graphics pipeline are a vertex shader stage, a geometry shader stage, a rasterization stage, and a depth processing stage.

4. The system as recited in claim 1, wherein the processor is further configured to:
determine how many draw calls were issued in between the first draw call and the second draw call; and
set a counter value in the wait sync event equal to said determined number of draw calls.

5. The system as recited in claim 1, wherein the processor is further configured to issue a time stamp event together with each draw call issued into the graphics pipeline.

6. The system as recited in claim 5, wherein the graphics pipeline is configured to increment the event counter in response to a time stamp event traversing the given intermediate stage.

7. The system as recited in claim 6, wherein the graphics pipeline is configured to decrement the event counter in response to a draw call traversing all stages of the graphics pipeline.

8. A method comprising:
determining, by a processor, that a second draw call is dependent on a first draw call;
issuing, by the processor, a wait sync event to a graphics pipeline prior to issuing the second draw call responsive to determining that the first draw call is still in-flight;
processing, by the graphics pipeline, the second draw call in one or more stages while the first draw call is still in-flight;
stalling the second draw call at a given intermediate stage of the graphics pipeline until an event counter equals a value specified by the wait sync event;
processing the second draw call by the given intermediate stage responsive to determining that the event counter equals the value specified by the wait sync event; and
completing processing of the second draw call to generate pixels for display.

9. The method as recited in claim 8, wherein the given intermediate stage of the graphics pipeline is a pixel shader stage.

10. The method as recited in claim 9, wherein the one or more stages of the graphics pipeline are a vertex shader stage, a geometry shader stage, a rasterization stage, and a depth processing stage.

11. The method as recited in claim 8, further comprising:
determining how many draw calls were issued in between the first draw call and the second draw call; and
setting a counter value in the wait sync event equal to said determined number of draw calls.

12. The method as recited in claim 8, further comprising issuing a time stamp event together with each draw call issued into the graphics pipeline.

13. The method as recited in claim 12, further comprising incrementing the event counter in response to a time stamp event traversing the given intermediate stage.

14. The method as recited in claim 13, further comprising decrementing the event counter in response to a draw call traversing all stages of the graphics pipeline.

15. An apparatus comprising:
a graphics pipeline comprising a plurality of stages; and
an event counter;
wherein the graphics pipeline is configured to:
receive a wait sync event that was issued prior to a second draw call being issued;
process the second draw call in one or more stages while a first draw call, upon which the second draw call is dependent, is still in-flight;
stall the second draw call at a given intermediate stage until the event counter equals a value specified by the wait sync event associated with the second draw call;
allow the second draw call to be processed by the given intermediate stage responsive to determining that the event counter equals the value specified by the wait sync event; and
complete processing of the second draw call to generate pixels for display.

16. The apparatus as recited in claim 15, wherein the given intermediate stage of the graphics pipeline is a pixel shader stage.

17. The apparatus as recited in claim 16, wherein the one or more stages of the graphics pipeline are a vertex shader stage, a geometry shader stage, a rasterization stage, and a depth processing stage.

18. The apparatus as recited in claim 15, further comprising a processor configured to:
determine how many draw calls were issued in between the first draw call and the second draw call; and
set a counter value in the wait sync event equal to said determined number of draw calls.

19. The apparatus as recited in claim 15, further comprising a processor configured to issue a time stamp event into the graphics pipeline with each draw call issued into the graphics pipeline.

20. The apparatus as recited in claim 19, wherein the graphics pipeline is configured to increment the event counter in response to a time stamp event traversing the given intermediate stage.

\* \* \* \* \*